United States Patent
Yoshida

(10) Patent No.: US 11,315,561 B2
(45) Date of Patent: Apr. 26, 2022

(54) AUDIO DEVICE AND COMPUTER READABLE PROGRAM

(71) Applicant: D&M Holdings, Inc., Kanagawa (JP)

(72) Inventor: Yukihiro Yoshida, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 183 days.

(21) Appl. No.: 16/638,540

(22) PCT Filed: Mar. 14, 2018

(86) PCT No.: PCT/JP2018/009883
§ 371 (c)(1),
(2) Date: Feb. 12, 2020

(87) PCT Pub. No.: WO2019/035235
PCT Pub. Date: Feb. 21, 2019

(65) Prior Publication Data
US 2021/0151044 A1 May 20, 2021

(30) Foreign Application Priority Data
Aug. 14, 2017 (JP) .............................. JP2017-156673

(51) Int. Cl.
| | |
|---|---|
| *G10L 15/00* | (2013.01) |
| *G10L 15/04* | (2013.01) |
| *G10L 15/22* | (2006.01) |
| *H05B 47/12* | (2020.01) |
| *H05B 45/20* | (2020.01) |
| *H05B 47/155* | (2020.01) |
| *H05B 45/325* | (2020.01) |

(Continued)

(52) U.S. Cl.
CPC .............. *G10L 15/22* (2013.01); *G06F 3/167* (2013.01); *G10L 15/08* (2013.01); *G10L 15/28* (2013.01);

(Continued)

(58) Field of Classification Search
CPC ......... G06F 3/167; G10L 15/00; G10L 15/08; G10L 15/22; G10L 15/28; H04R 1/08;
(Continued)

(56) References Cited

U.S. PATENT DOCUMENTS

| | | | | |
|---|---|---|---|---|
| 4,107,462 A | * | 8/1978 | Asija ...................... | A63H 3/006 367/198 |
| 7,630,646 B2 | * | 12/2009 | Anderson ............ | H04R 23/008 398/132 |

(Continued)

FOREIGN PATENT DOCUMENTS

| | | |
|---|---|---|
| JP | 2000-106588 | 4/2000 |
| JP | 2000-194393 | 7/2000 |

(Continued)

*Primary Examiner* — Khai N. Nguyen
(74) *Attorney, Agent, or Firm* — Peter A. Nieves; Sheehan Phinney Bass & Green PA

(57) ABSTRACT

[Problem] To provide an audio device having a voice operation receiving function with which the state of a voice recognition process can be notified in detail without affecting an audio playback environment, and which is inexpensive and has an excellent degree of freedom in design. [Solution] A wireless speaker 1 has a voice operation receiving function that receives an operation by a voice input into a microphone 11. The wireless speaker comprises: an LED 12; an LED control unit 18 that subjects the LED 12 to PWM control; and a lighting pattern storage unit 17 that stores a lighting pattern in which the brightness is changed on a time axis for each state of a voice recognition process. The LED control unit 18 subjects the LED 12 to PWM control in accordance with the lighting pattern stored in the lighting pattern storage unit 17 corresponding to the state of the voice recognition process performed on the voice input into the microphone 11.

4 Claims, 5 Drawing Sheets

(51) Int. Cl.
*H05B 45/10* (2020.01)
*G06F 3/16* (2006.01)
*G10L 15/08* (2006.01)
*G10L 15/28* (2013.01)
*H04R 1/08* (2006.01)

(52) U.S. Cl.
CPC .............. *H04R 1/08* (2013.01); *H05B 45/10* (2020.01); *H05B 45/20* (2020.01); *H05B 45/325* (2020.01); *H05B 47/12* (2020.01); *H05B 47/155* (2020.01)

(58) Field of Classification Search
CPC ...... H05B 45/10; H05B 45/20; H05B 45/325; H05B 47/12; H05B 47/155; Y02B 20/40
USPC ........................................................ 704/251
See application file for complete search history.

(56) References Cited

U.S. PATENT DOCUMENTS

| | | | | |
|---|---|---|---|---|
| 7,987,294 B2* | 7/2011 | Bryce | ................. | H04L 12/2809 709/248 |
| 9,313,575 B2* | 4/2016 | Wang | ..................... | G08C 17/02 |
| 9,554,089 B2* | 1/2017 | Tang | ..................... | H04N 7/148 |
| 9,854,654 B2* | 12/2017 | Gan | ..................... | G06F 3/04817 |
| 9,900,957 B2* | 2/2018 | van de Ven | .......... | H05B 47/115 |
| 10,660,187 B1* | 5/2020 | Zima | ..................... | H05B 47/19 |
| 2005/0275626 A1* | 12/2005 | Mueller | ............... | H05B 47/125 345/156 |
| 2014/0254829 A1* | 9/2014 | Wang | ..................... | H04M 3/56 381/105 |
| 2014/0323183 A1* | 10/2014 | Klein | ................... | H04M 1/6066 455/569.1 |
| 2016/0212376 A1* | 7/2016 | Tang | ..................... | F21V 33/0052 |
| 2016/0366746 A1* | 12/2016 | van de Ven | ........... | H05B 45/20 |
| 2017/0223801 A1* | 8/2017 | Gan | ..................... | G06F 3/04886 |
| 2018/0082685 A1* | 3/2018 | Carlin | .................... | H05B 45/20 |
| 2018/0096688 A1* | 4/2018 | Kim | ........................ | G10L 15/28 |
| 2021/0151044 A1* | 5/2021 | Yoshida | ................. | H05B 45/10 |

FOREIGN PATENT DOCUMENTS

| | | |
|---|---|---|
| JP | 2001-210114 | 8/2011 |
| JP | 2012-185302 | 9/2012 |
| JP | 2014-219614 | 11/2014 |

* cited by examiner

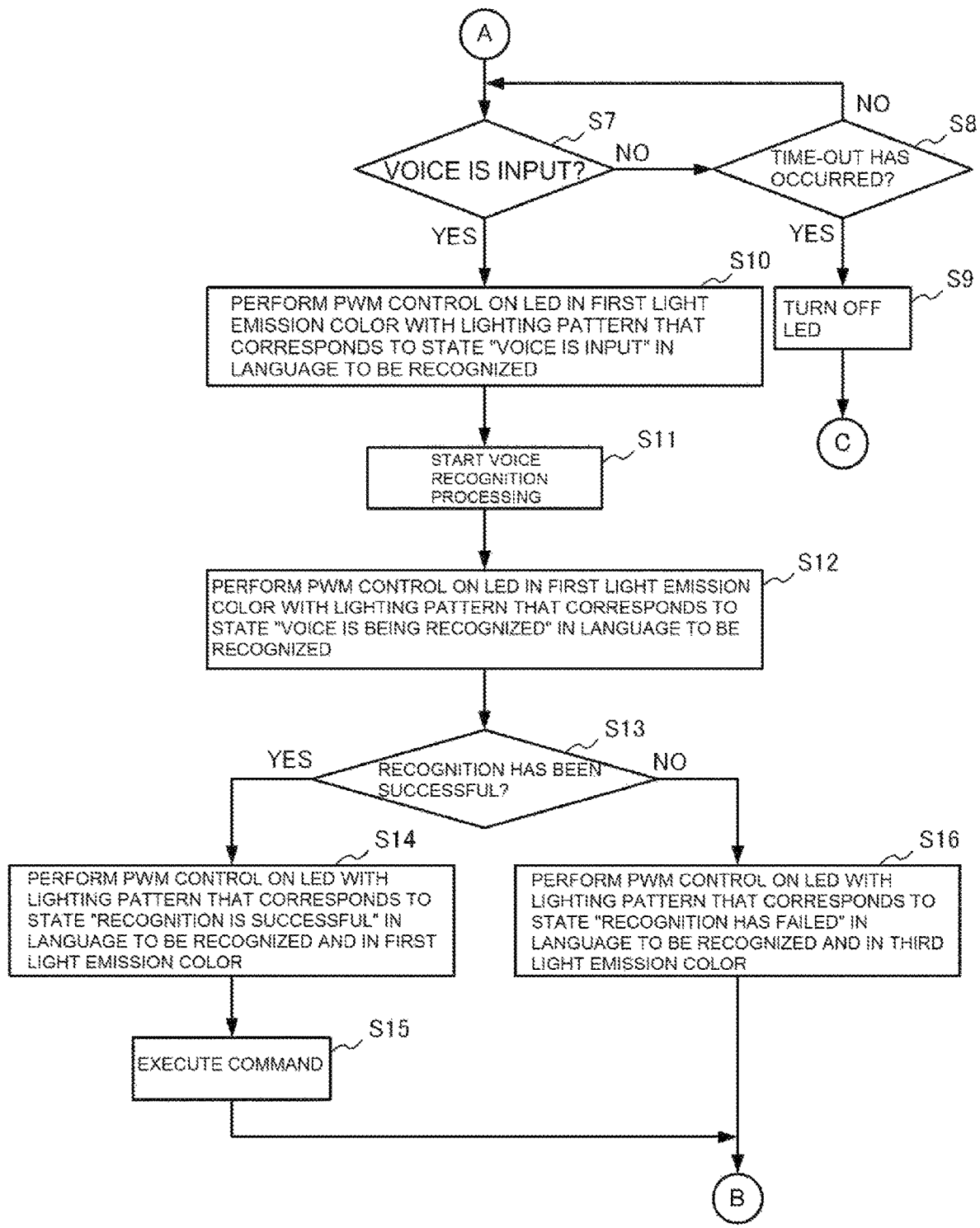

AUDIO DEVICE AND COMPUTER READABLE PROGRAM

CROSS-REFERENCE TO RELATED APPLICATIONS

This application is the National Stage of International Application No. PCT/JP2018/009883, filed Mar. 14, 2018, which claims the benefit of Japanese Patent Application No. 2017-156673, filed Aug. 14, 2017. The contents of these prior applications are incorporated by reference herein in their entirety.

TECHNICAL FIELD

The present invention relates to an audio device having a function of receiving a voice operation.

BACKGROUND ART

In Patent Literature 1, there is disclosed an audio device configured to wirelessly download audio data from a media server or the like to reproduce the audio data in accordance with an operation received from a user through a remote controller.

In Patent Literature 2, there is disclosed a telephone set with a voice reply function, which is configured to allow a user to visually see a voice recognition result of a voice input to a microphone by varying a display form of a light emitting diode (LED).

CITATION LIST

Patent Literature

[PTL 1] U.S. Pat. No. 7,987,294 A
[PTL 2] JP 2000-106588 A

SUMMARY OF INVENTION

Technical Problem

In recent years, it has been demanded that such an audio device as described in Patent Literature 1 have a voice operation reception function of performing voice recognition processing on a voice input to a microphone to receive a voice operation, to thereby allow various operations to be performed without the use of the remote controller. In this case, in a case where a voice operation is received while audio data is being reproduced, when a reply to a voice recognition result of the input voice is output by voice, a voice indicating the voice recognition result is consequently mixed into a reproduced sound of the audio data, which affects an audio reproduction environment. It is therefore preferred that the voice recognition result be indicated through use of an LED as in the case of the telephone set with a voice reply function described in Patent Literature 2.

However, in the telephone set with a voice reply function described in Patent Literature 2, the display form of the LED is set to anyone of a turned-off state, a blinking state, and a turned-on state, to thereby merely notify the user of a case in which it has been determined that there is no voice reply (turned-off state), a case in which it has been determined that the input voice is not a predetermined voice (blinking state), and a case in which it has been determined that the input voice is the predetermined voice (turned-on state). Thus, even when this technology is applied to an audio device, a state of the voice recognition processing cannot be notified to the user in more detail. Meanwhile, through use of a plurality of LEDs or through use of a liquid crystal display (LCD) instead of the LEDs, a state of the voice recognition processing can be notified to the user in more detail, but cost is increased accordingly. Further, a display unit for notifying of a state of the voice recognition processing occupies a large proportion of the front surface of the audio device, which imposes a limitation on the design of the audio device.

The present invention has been made in view of the above-mentioned circumstances, and has an object to provide an audio device having a voice operation reception function, which is capable of notifying of a detailed state of voice recognition processing without affecting an audio reproduction environment, and is low in cost and excellent in the degree of freedom in design.

Solution to Problem

In order to solve the above-mentioned problem, in one embodiment of the present invention, a plurality of lighting patterns in each of which brightness is changed on a time axis are provided, and pulse width modulation (PWM) control is performed on an LED based on the plurality of lighting patterns, to thereby express a state of the voice recognition processing. In this case, the lighting pattern may have an intensity of brightness synchronized with intonation and accent of a voice message representing the state of the voice recognition processing.

For example, according to one embodiment of the present invention, there is provided an audio device, which has a voice operation reception function of receiving an operation through a voice input to a microphone, the audio device including: a light emitting diode (LED); LED control means for performing pulse width modulation (PWM) control on the LED; and lighting pattern storage means for storing, for each state of voice recognition processing, a lighting pattern in which brightness is changed on a time axis, in which the LED control means is configured to perform PWM control on the LED in accordance with a lighting pattern that is stored in the lighting pattern storage means in association with a state of voice recognition processing performed on the voice input to the microphone.

Advantageous Effects of Invention

According to the present invention, the plurality of lighting patterns in which the brightness is changed on the time axis are provided, and the PWM control is performed on the LED through use of the plurality of lighting patterns, to thereby express the state of the voice recognition processing. Accordingly, it is possible to express the detailed state of the voice recognition processing with only one LED. Thus, according to the present invention, it is possible to provide the audio device having the voice operation reception function, which is capable of notifying of the detailed state of the voice recognition processing without affecting an audio reproduction environment, and is low in cost and excellent in the degree of freedom in design.

BRIEF DESCRIPTION OF DRAWINGS

FIG. 5 is a diagram for illustrating the operation flow of the wireless speaker 1 (continued from FIG. 4).

DESCRIPTION OF EMBODIMENTS

Now, one embodiment of the present invention is described with reference to the accompanying drawings.

Figure 1:
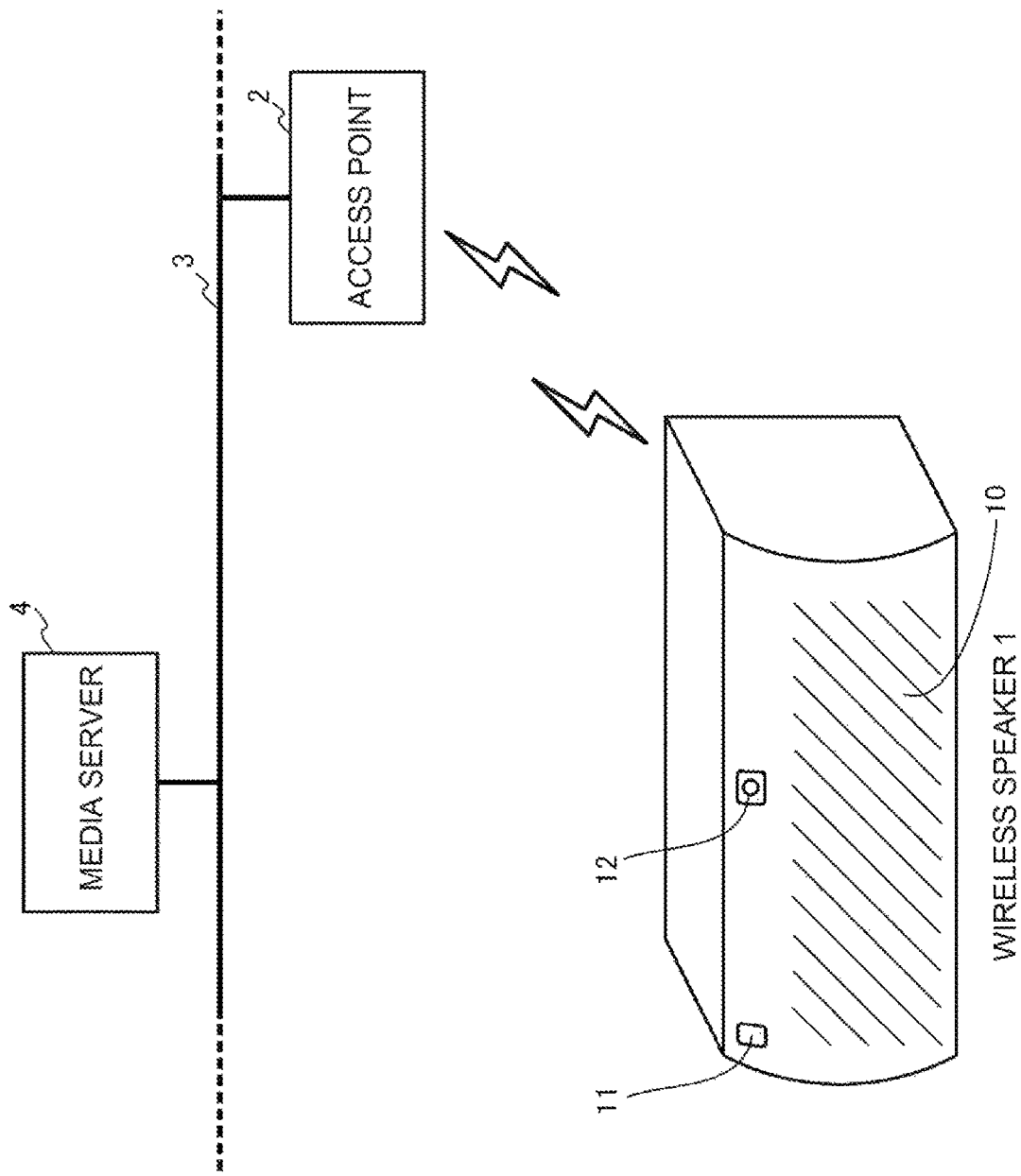
FIG. 1 is a diagram for illustrating a schematic configuration of a wireless audio system in one embodiment of the present invention.

FIG. 1 is a diagram for illustrating a schematic configuration of a wireless audio system in this embodiment.

As illustrated in FIG. 1, the wireless audio system in this embodiment includes a media server 4 and a wireless speaker 1, which is connected to the media server 4 via an access point 2 and a network 3, such as a WAN or a LAN. The media server 4 provides audio data to the wireless speaker 1.

The wireless speaker 1 includes a microphone 11 on its front surface, on which a speaker 10 is arranged, and performs voice recognition processing on a voice input to the microphone 11 to receive a voice operation from a user. Then, the wireless speaker 1 follows the voice operation received from the user to download audio data from the media server 4 and reproduce the audio data, and outputs a reproduced sound of the audio data from the speaker 10. Further, the wireless speaker 1 includes a full-color LED 12 on its front surface, on which the speaker 10 is arranged, and uses the LED 12 to notify the user of a state of the voice recognition processing performed on the voice input to the microphone 11.

Figure 2:
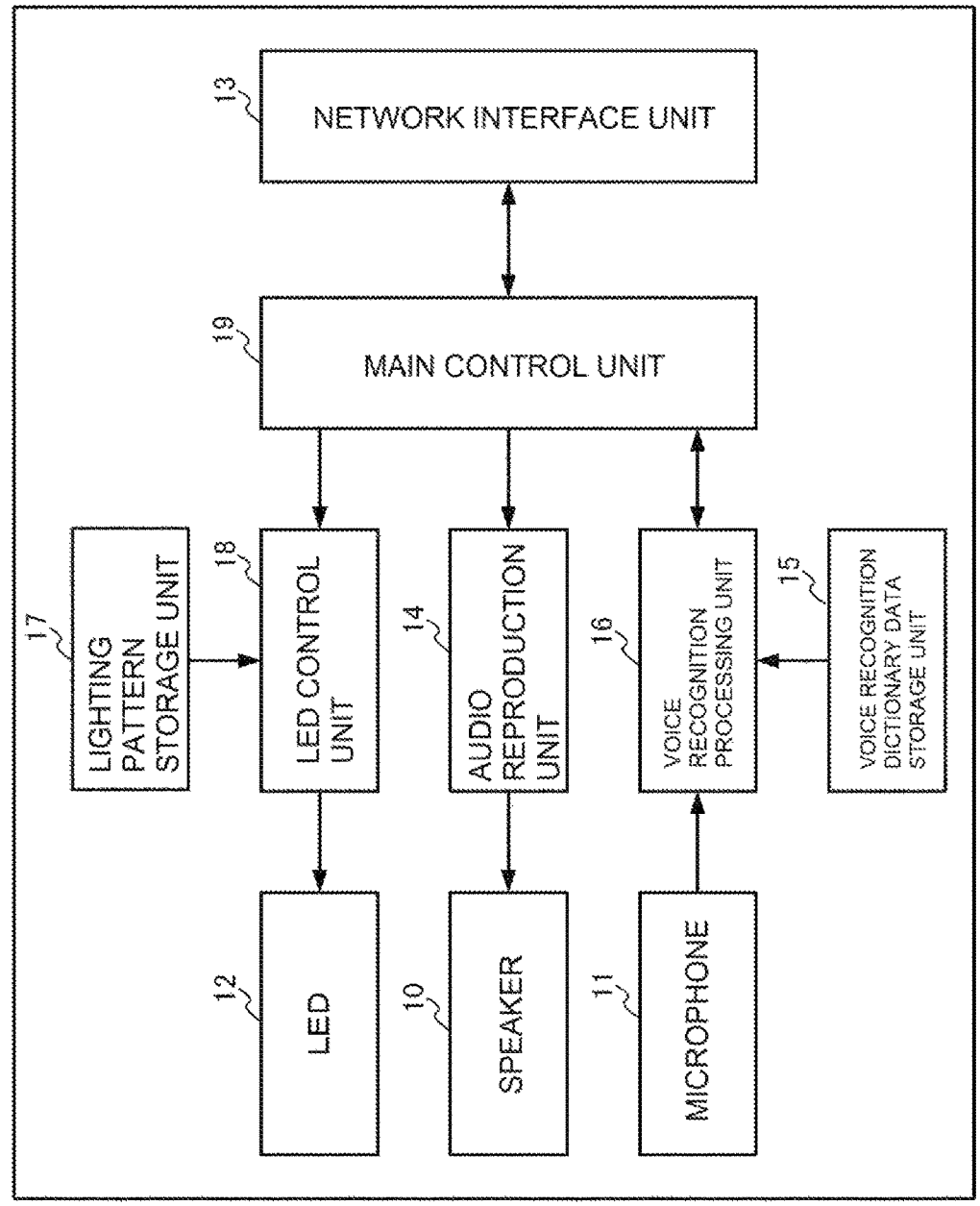
FIG. 2 is a diagram for illustrating a schematic functional configuration of a wireless speaker 1.

FIG. 2 is a diagram for illustrating a schematic functional configuration of the wireless speaker 1.

As illustrated in FIG. 2, the wireless speaker 1 includes the speaker 10, the microphone 11, the full-color LED 12, a network interface unit 13, an audio reproduction unit 14, a voice recognition dictionary data storage unit 15, a voice recognition processing unit 16, a lighting pattern storage unit 17, an LED control unit 18, and a main control unit 19.

The network interface unit 13 is an interface for communicating to/from the media server 4 via the access point 2 and the network 3.

The audio reproduction unit 14 reproduces audio data received from the main control unit 19, and outputs a reproduced sound of the audio data from the speaker 10.

The voice recognition dictionary data storage unit 15 stores, for each language, such as Japanese and English, voice recognition dictionary data to be used in voice recognition processing.

The voice recognition processing unit 16 refers to the voice recognition dictionary data storage unit 15 to perform voice recognition processing on a voice input to the microphone 11.

The lighting pattern storage unit 17 stores, for each language, such as Japanese and English, a lighting pattern of the LED 12 in which brightness is changed on a time axis, in association with a state of the voice recognition processing. The lighting pattern is to notify the user of a corresponding state of the voice recognition processing, and an intensity of brightness on the time axis is synchronized with intonation and accent of a voice message representing a state of the voice recognition processing in a corresponding language.

FIG. 3(A) to FIG. 3(E) are each a graph for schematically showing an example of the lighting pattern.

Cases in which the voice message is Japanese are illustrated as examples. In the figures, a vertical axis 170 indicates an intensity of brightness (W), and a horizontal axis 171 indicates time (t).

Figure 3:
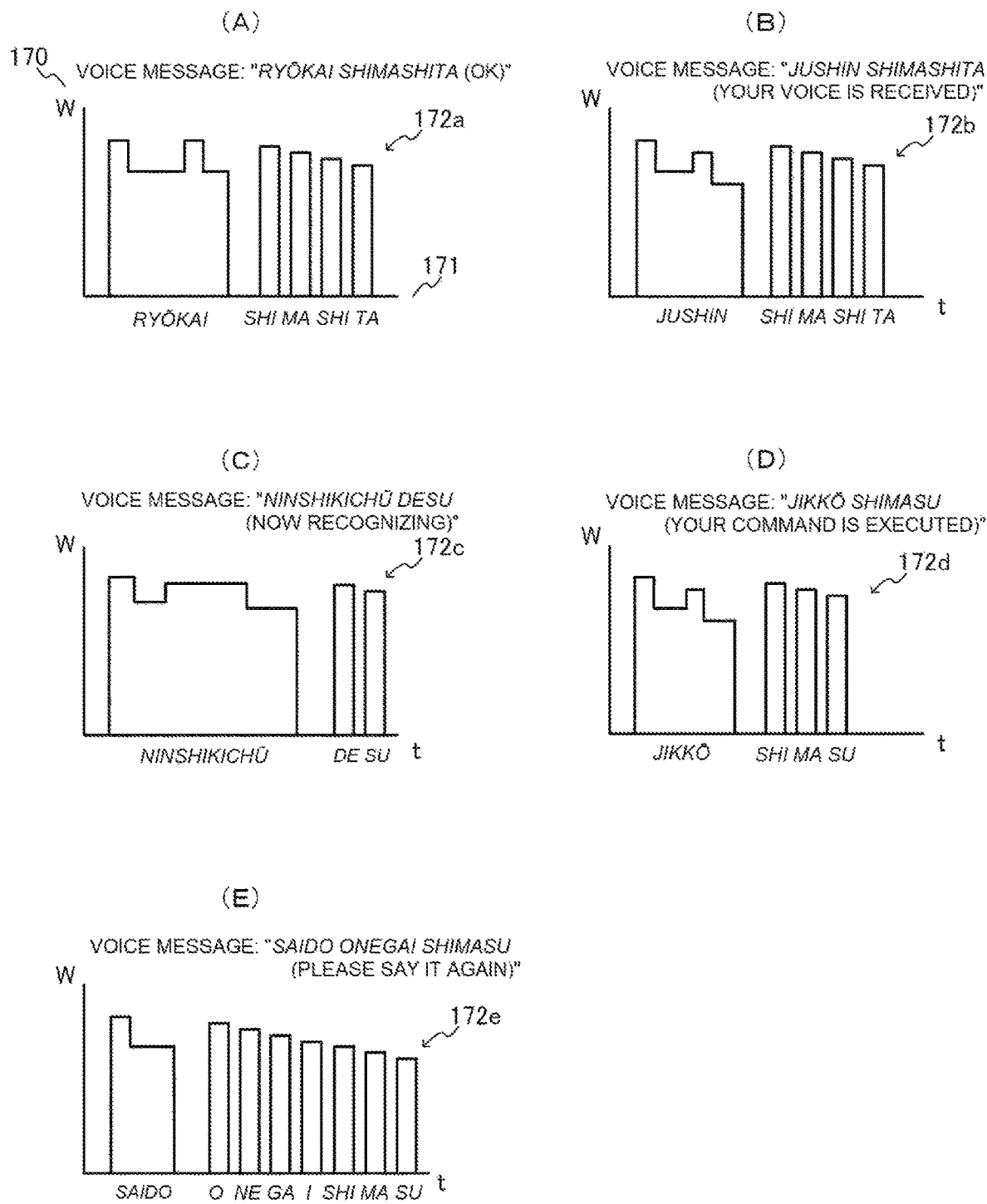
FIG. 3(A) to FIG. 3(E) are each a graph for schematically showing an example of a lighting pattern.

FIG. 3(A) is an illustration of an example of a lighting pattern 172a for notifying the user of the fact that a recognition result of voice recognition processing performed on a voice input to the microphone 11 is to request start of reception of a voice operation (e.g., "kaishi (Start)") and the state of the voice recognition processing is set to "voice operation reception is started" in response to this. In the lighting pattern 172a, the intensity of brightness on the time axis is changed in synchronization with the intonation and accent of the voice message "ryōkai shimashita (OK)".

FIG. 3(B) is an illustration of an example of a lighting pattern 172b for notifying, when a voice is input to the microphone 11 after the start of reception of the voice operation, the user of the fact that the state of the voice recognition processing is set to "voice is input" in response to this. In the lighting pattern 172b, the intensity of brightness on the time axis is changed in synchronization with the intonation and accent of the voice message "jushin shimashita (Your voice is received)".

FIG. 3(C) is an illustration of an example of a lighting pattern 172c for notifying, when voice recognition is being performed on the voice input to the microphone 11, the user of the fact that the state of the voice recognition processing is set to "voice is being recognized" in response to this. In the lighting pattern 172c, the intensity of brightness on the time axis is changed in synchronization with the intonation and accent of the voice message "ninshikichū desu (Now recognizing)".

FIG. 3(D) is an illustration of an example of a lighting pattern 172d for notifying, when the voice recognition processing performed on the voice input to the microphone 11 has been successful and a command has successfully been received from the user, the user of the fact that the state of the voice recognition processing is set to "recognition is successful" in response to this. In the lighting pattern 172d, the intensity of brightness on the time axis is changed in synchronization with the intonation and accent of the voice message "jikkō shimasu (Your command is executed)".

FIG. 3(E) is an illustration of an example of a lighting pattern 172e for notifying, when the voice recognition processing performed on the voice input to the microphone 11 has failed, the user of the fact that the state of the voice recognition processing is set to "recognition has failed" in response to this. In the lighting pattern 172e, the intensity of brightness on the time axis is changed in synchronization with the intonation and accent of the voice message "saido onegai shimasu (Please say it again)".

In FIG. 3(A) to FIG. 3(E), the exemplary lighting patterns to be used when a voice message is Japanese are illustrated, but also in a lighting pattern to be used when a voice message is another language, for example, English, the intensity of brightness on the time axis is changed in synchronization with intonation and accent as in the case of Japanese.

The LED control unit 18 refers to the lighting pattern storage unit 17 to perform PWM control on the LED 12 so that its brightness is changed on the time axis in accordance with a lighting pattern specified by the main control unit 19.

The main control unit 19 centrally controls the network interface unit 13, the audio reproduction unit 14, the voice recognition processing unit 16, and the LED control unit 18.

Next, an operation of the wireless speaker 1 configured as described above is described.

Figure 4:
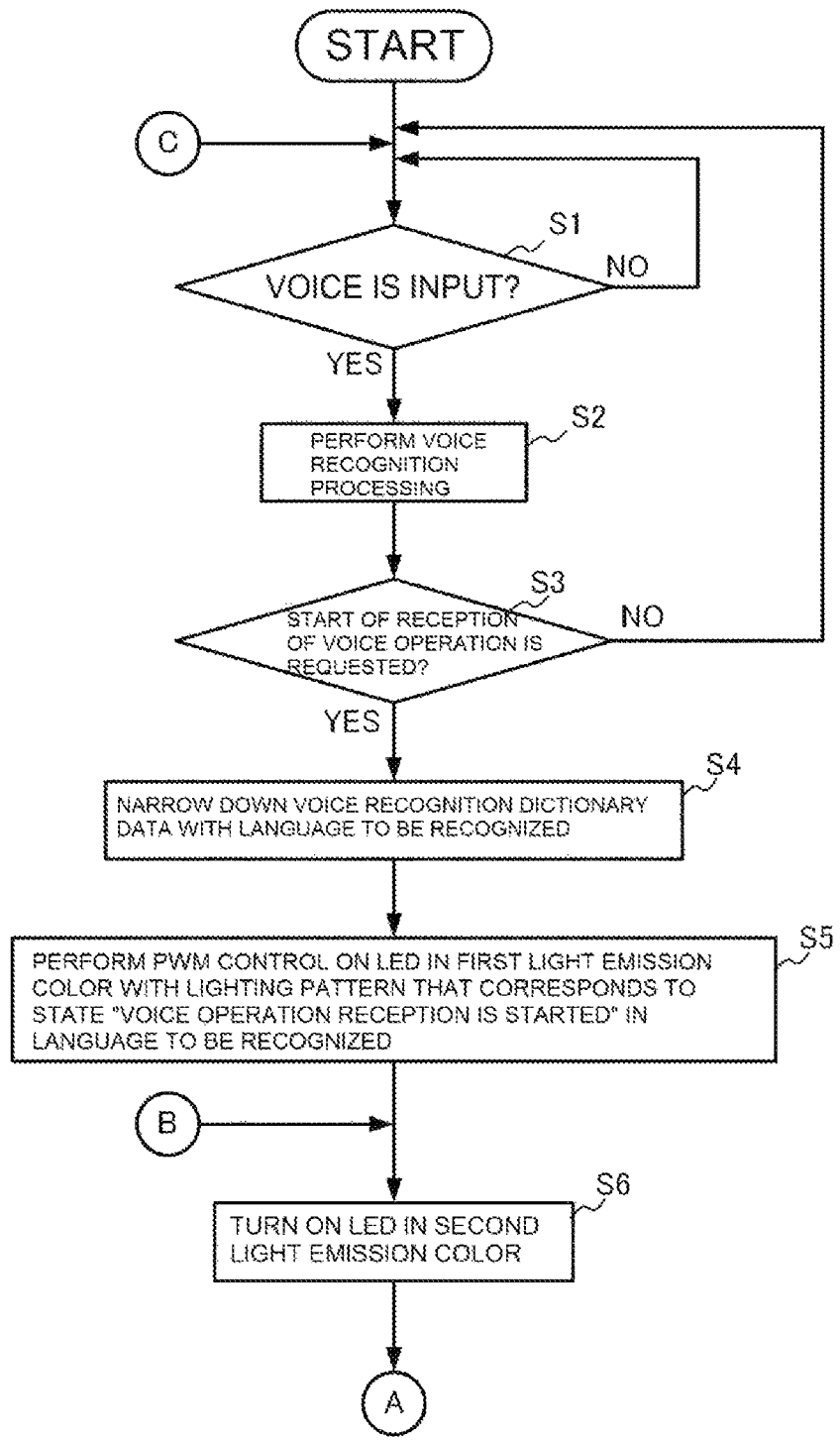
FIG. 4 is a diagram for illustrating an operation flow of the wireless speaker 1.

FIG. 4 and FIG. 5 are diagrams for illustrating a flow of the operation of the wireless speaker 1.

First, when a voice is input from the user through the microphone 11 (YES in Step S1), the voice recognition processing unit 16 refers to the voice recognition dictionary data of each language stored in the voice recognition dictionary data storage unit 15 to perform voice recognition processing on the input voice (Step S2). Then, the voice recognition processing unit 16 passes a recognition result of the voice recognition processing to the main control unit 19.

In response to this, the main control unit 19 determines whether or not a recognition result of the voice recognition processing is to request start of reception of a voice operation (Step S3). For example, in a case where the input voice is Japanese, when the recognized voice is "kaishi (Start)", the main control unit 19 determines that the voice is to request start of reception of the voice operation, and in a case where the input voice is English, when the recognized voice is "Start", the main control unit 19 determines that the voice is to request start of reception of the voice operation. When the recognition result of the voice recognition processing is not to request start of reception of the voice operation (NO in Step S3), the flow returns to Step S1.

Meanwhile, when the recognition result of the voice recognition processing is to request start of reception of the voice operation (YES in Step S3), the main control unit 19 sets a language forming a sentence represented by the recognition result of the voice recognition processing, as a language to be recognized. Then, the main control unit 19 instructs the voice recognition processing unit 16 to narrow down the voice recognition dictionary data to that of the language to be recognized. In response to this, the voice recognition processing unit 16 narrows down the voice recognition dictionary data to be used in the subsequent voice recognition processing to the voice recognition dictionary data of the language to be recognized (Step S4).

Next, the main control unit 19 notifies the LED control unit 18 of the language to be recognized, the state "voice operation reception is started" of the voice recognition processing, and a light emission color "first light emission color (e.g., blue)" to instruct the LED control unit 18 to turn on the LED 12. In response to this, the LED control unit 18 identifies, from the lighting pattern storage unit 17, a lighting pattern that is associated with the language to be recognized and the state "voice operation reception is started" of the voice recognition processing. Then, the LED control unit 18 performs PWM control on the LED 12 in the first light emission color so that its brightness is changed in accordance with the identified lighting pattern (Step S5). With this control, the user is notified of the fact that the reception of the voice operation is enabled.

After that, the main control unit 19 notifies the LED control unit 18 of a light emission color "second light emission color (e.g., white)" to instruct the LED control unit 18 to turn on the LED 12. In response to this, the LED control unit 18 turns on the LED 12 in the second light emission color (Step S6). With this control, the user is notified of the fact that input of a voice is being waited for.

Next, when a voice is input from the user through the microphone 11 (YES in Step S7), the voice recognition processing unit 16 notifies the main control unit 19 of the fact that the voice has been input. The main control unit 19 notifies the LED control unit 18 of the language to be recognized, the state "voice is input" of the voice recognition processing, and the light emission color "first light emission color" to instruct the LED control unit 18 to turn on the LED 12. In response to this, the LED control unit 18 identifies, from the lighting pattern storage unit 17, a lighting pattern that is associated with the language to be recognized and the state "voice is input" of the voice recognition processing. Then, the LED control unit 18 performs PWM control on the LED 12 in the first light emission color so that its brightness is changed in accordance with the identified lighting pattern (Step S10). With this control, the user is notified of the fact that the input of the voice has been detected.

After that, the voice recognition processing unit 16 refers to the voice recognition dictionary data of the language to be recognized stored in the voice recognition dictionary data storage unit 15 to start voice recognition processing on the input voice (Step S11). Further, the voice recognition processing unit 16 notifies the main control unit 19 of the fact that the voice recognition processing is being performed. The main control unit 19 notifies the LED control unit 18 of the language to be recognized, the state "voice is being recognized" of the voice recognition processing, and the light emission color "first light emission color" to instruct the LED control unit 18 to turn on the LED 12. In response to this, the LED control unit 18 identifies, from the lighting pattern storage unit 17, a lighting pattern that is associated with the language to be recognized and the state "voice is being recognized" of the voice recognition processing. Then, the LED control unit 18 performs PWM control on the LED 12 in the first light emission color so that its brightness is changed in accordance with the identified lighting pattern (Step S12). With this control, the user is notified of the fact that the voice recognition processing is being performed on the input voice.

Next, the voice recognition processing unit 16 passes a recognition result of the voice recognition processing to the main control unit 19. In this case, when the voice recognition processing has failed, the voice recognition processing unit 16 notifies the main control unit 19 of this fact. In response to this, when the voice recognition processing performed in the voice recognition processing unit 16 has failed (NO in Step S13), the main control unit 19 notifies the LED control unit 18 of the language to be recognized, the state "recognition has failed" of the voice recognition processing, and a light emission color "third light emission color (e.g., red)" to instruct the LED control unit 18 to turn on the LED 12. In response to this, the LED control unit 18 identifies, from the lighting pattern storage unit 17, a lighting pattern that is associated with the language to be recognized and the state "recognition has failed" of the voice recognition processing. Then, the LED control unit 18 performs PWM control on the LED 12 in the third light emission color so that its brightness is changed in accordance with the identified lighting pattern (Step S16). With this control, the user is notified of the fact that a voice is required to be input again because the reception of the voice operation has failed. After that, the flow returns to Step S6.

Meanwhile, when the voice recognition processing performed in the voice recognition processing unit 16 has been successful (YES in Step S13), the main control unit 19 notifies the LED control unit 18 of the language to be recognized, the state "recognition is successful" of the voice recognition processing, and the light emission color "first light emission color" to instruct the LED control unit 18 to turn on the LED 12. In response to this, the LED control unit 18 identifies, from the lighting pattern storage unit 17, a lighting pattern that is associated with the language to be recognized and the state "recognition is successful" of the voice recognition processing. Then, the LED control unit 18 performs PWM control on the LED 12 in the first light emission color so that its brightness is changed in accordance with the identified lighting pattern (Step S14). With this control, the user is notified of the fact that the reception of the voice operation has been successful.

After that, the main control unit 19 executes a command indicated by a processing result of the voice recognition processing received from the voice recognition processing unit 16 (Step S15). For example, when the processing result of the voice recognition processing is a music name, the main control unit 19 accesses the media server 4 via the network interface unit 13 to download audio data having the music name from the media server 4. When the processing result of the voice recognition processing is to request start of reproduction (for example, "saisei" in the case of Japanese, and "Play" in the case of English), the main control unit 19 instructs the audio reproduction unit 14 to start reproduction of the audio data downloaded from the media server 4. When the processing result of the voice recognition processing is to request stop of reproduction (for example, "teishi" in the case of Japanese, and "Stop" in the case of English), the main control unit 19 instructs the audio reproduction unit 14 to stop reproduction of the audio data. When the processing result of the voice recognition processing is to request an increase of the volume of a reproduced sound (for example, "onryō zōdai" in the case of Japanese, and "Volume up" in the case of English), the main control unit 19 instructs the audio reproduction unit 14 to increase the volume of the reproduced sound. When the processing result of the voice recognition processing is to request a decrease of the volume of a reproduced sound (for example, "onryō genshō" in the case of Japanese, and "Volume down" in the case of English), the main control unit 19 instructs the audio reproduction unit 14 to decrease the volume of the reproduced sound. After that, the flow returns to Step S6.

Meanwhile, when no voice is input to the voice recognition processing unit 16 through the microphone 11 (NO in Step S7), and a time-out occurs due to the elapse of a predetermined period of time (YES in Step S8), the main control unit 19 instructs the LED control unit 18 to turn off the LED 12. In response to this, the LED control unit 18 turns off the LED 12 (Step S9). After that, the flow returns to Step S1.

One embodiment of the present invention is described above.

In this embodiment, the plurality of lighting patterns in which the brightness is changed on the time axis are provided, and the PWM control is performed on the LED 12 through use of the plurality of lighting patterns, to thereby express the state of the voice recognition processing. Accordingly, it is possible to express the detailed state of the voice recognition processing with only one LED 12 arranged on the front surface of the wireless speaker 1. Therefore, according to this embodiment, it is possible to provide the wireless speaker 1 having the voice operation reception function, which is capable of notifying of the detailed state of the voice recognition processing without affecting the audio reproduction environment, and is low in cost and excellent in the degree of freedom in design.

Further, in this embodiment, for each state of the voice recognition processing, the lighting pattern having the intensity of brightness synchronized with intonation and accent of the voice message representing the state of the voice recognition processing is used. Accordingly, the user can understand, through the LED 12 subjected to PWM control in accordance with a lighting pattern, the intonation and accent of the voice message corresponding to the lighting pattern, and hence the user can intuitively grasp the state of the voice recognition processing.

Further, in this embodiment, when the state of the voice recognition processing is "waiting for input of voice", the LED 12 is turned on in the second light emission color, and when the state of the voice recognition processing is "recognition has failed", the LED 12 is turned on in the third light emission color and in a corresponding lighting pattern. Meanwhile, when the state of the voice recognition processing is a state other than "waiting for input of voice" and "recognition has failed", that is, any one of "voice operation reception is started", "voice is input", "voice is being recognized", and "recognition is successful", the LED 12 is turned on in the first light emission color and in a corresponding lighting pattern. Therefore, according to this embodiment, the user can also grasp the state of the voice recognition processing from the light emission color of the LED 12.

Further, in this embodiment, when a recognition result of the voice recognition processing performed on a voice input to the microphone 11 indicates a request to start reception of the voice operation, voice recognition dictionary data to be used in the voice recognition processing performed on a voice subsequently input to the microphone 11 is narrowed down to voice recognition dictionary data of a language (language to be recognized) forming a sentence represented by the recognition result. Therefore, according to this embodiment, it is possible to efficiently perform the voice recognition processing by reducing the time required for the voice recognition processing.

The present invention is not limited to the embodiment described above, and various modifications may be made thereto within the scope of the gist of the present invention.

For example, in the embodiment described above, when the PWM control is performed on the LED 12 in accordance with a lighting pattern, the light emission color of the LED 12 may be changed in accordance with the intensity of brightness. With this configuration, the user can more easily understand the intonation and accent of a voice message corresponding to the lighting pattern, and hence the user can more intuitively grasp the state of the voice recognition processing.

Further, in the embodiment described above, when the voice recognition processing performed on the input voice has been successful (YES in Step S13 of FIG. 5), the PWM control is performed on the LED 12 in accordance with a lighting pattern corresponding to the language to be recognized and the state "recognition is successful" of the voice recognition processing (Step S14 of FIG. 5). The lighting pattern has the intensity of brightness synchronized with the intonation and accent of a voice message representing the state "recognition is successful" of the voice recognition processing in the language to be recognized, but a command obtained as a result of the voice recognition may be included in the voice message to notify the user of the fact that the command obtained as a result of the voice recognition is to be executed.

For example, when a command obtained as a result of the voice recognition is a music name, the PWM control is performed on the LED 12 through use of a lighting pattern having the intensity of brightness synchronized with intonation and accent of voice data (e.g., "It is downloaded") representing the downloading of audio data having the music name. When a command obtained as a result of the voice recognition is to start reproduction, the PWM control is performed on the LED 12 through use of a lighting pattern having the intensity of brightness synchronized with intonation and accent of voice data (e.g., "It is played") representing the start of reproduction. When a command obtained as a result of voice recognition is to stop reproduction, the PWM control is performed on the LED 12 through use of a lighting pattern having the intensity of brightness synchronized with intonation and accent of voice data (e.g., "It is stopped") representing the stop of reproduction. When a command obtained as a result of the voice recognition is to increase the volume of a reproduced sound, the PWM control is performed on the LED 12 through use of a lighting pattern having the intensity of brightness synchronized with intonation and accent of voice data (e.g., "Volume is turned up") representing the increase of the volume. When a command obtained as a result of the voice recognition is to decrease the volume of a reproduced sound, the PWM control is performed on the LED 12 through use of a lighting pattern having the intensity of brightness synchronized with intonation and accent of voice data (e.g., "Volume is turned down") representing the decrease of the volume.

Further, in the embodiment described above, the case in which the wireless speaker 1 performs voice recognition processing is taken as an example for description. However, the present invention is not limited thereto.

For example, voice recognition processing may be performed through use of an external server (voice recognition server) connected to the network 3. Specifically, when a voice is input to the microphone 11, the main control unit 19 transmits voice data on the input voice to the external server via the network interface unit 13 to request the external server to perform voice recognition processing on the voice data. Then, the main control unit 19 acquires a processing result of the voice recognition processing from the external server. In this case, the voice recognition dictionary data storage unit 15 and the voice recognition processing unit 16 can be omitted from the wireless speaker 1.

As another example, voice recognition processing may be performed through use of a voice input terminal provided separately from the wireless speaker 1. Specifically, the voice input terminal performs voice recognition processing on a voice input thereto to receive a voice operation from a user. Then, the voice input terminal transmits to the wireless speaker 1 a control command corresponding to the received voice operation. With this control, the wireless speaker 1 performs an operation corresponding to the voice operation received by the voice input terminal from the user.

Further, in the embodiment described above, when a recognition result of voice recognition processing performed on a voice input to the microphone 11 indicates a request to start reception of a voice operation, voice recognition dictionary data to be used in the voice recognition processing performed on a voice subsequently input to the microphone 11 is narrowed down to voice recognition dictionary data of a language (language to be recognized) forming a sentence represented by the recognition result. However, the present invention is not limited thereto. Even in voice recognition processing performed on a voice input to the microphone 11 after the request to start reception of the voice operation is made, the voice recognition processing may be performed through use of pieces of voice recognition dictionary data of all available languages without narrowing down the voice recognition dictionary data.

Further, in the embodiment described above, the functional configuration of the wireless speaker 1 illustrated in FIG. 2 may be implemented by hardware through use of an integrated logic IC, for example, an application specific integrated circuit (ASIC) or a field programmable gate array (FPGA), or may be implemented by software through use of a computer, for example, a digital signal processor (DSP). Alternatively, the functional configuration may be implemented by a general computer, for example, a personal computer including a central processing unit (CPU), a memory, a flash memory, a hard disk drive or another such auxiliary storage device, a wireless LAN adaptor or another such communication device, a speaker, and a microphone, causing the CPU to load a predetermined program into the memory from the auxiliary storage device and execute the program.

Further, in the embodiment described above, as the audio device, the wireless speaker 1 configured to download audio data from the media server 4 and reproduce the audio data to output the audio data as a sound from the speaker 10 is taken as an example for description. However, the present invention is not limited thereto. The present invention is widely applicable to audio devices having a voice operation reception function.

REFERENCE SIGNS LIST

1: wireless speaker, 2: access point, 3: network, 4: media server, 10: speaker, 11: microphone, 12: LED, 13: network interface unit, 14: audio reproduction unit, 15: voice recognition dictionary data storage unit, 16: voice recognition processing unit, 17: lighting pattern storage unit, 18: LED control unit, 19 main control unit

The invention claimed is:

1. An audio device, which has a voice operation reception function of receiving an operation through a voice input to a microphone, the audio device comprising:
   a light emitting diode (LED);
   LED control means for performing pulse width modulation (PWM) control on the LED;
   lighting pattern storage means for storing, for each state of voice recognition processing, a lighting pattern in which brightness is changed on a time axis,
   wherein the LED control means is configured to perform PWM control on the LED in accordance with a lighting pattern that is stored in the lighting pattern storage means in association with a state of voice recognition processing performed on the voice input to the microphone;
   dictionary data storage means for storing voice recognition dictionary data for each language; and
   voice recognition processing means for performing voice recognition processing on the voice input to the microphone through use of the voice recognition dictionary data stored in the dictionary data storage means,
   wherein, when a recognition result of the voice recognition processing performed on the voice input to the microphone indicates a request to start reception of a voice operation, the voice recognition processing means narrows down voice recognition dictionary data to be used in voice recognition processing performed on a voice subsequently input to the microphone, to voice recognition dictionary data of a language forming a sentence represented by the recognition result.

2. The audio device according to claim 1, wherein the lighting pattern has an intensity of brightness synchronized with intonation and accent of a voice message representing a state of voice recognition processing corresponding to the lighting pattern.

3. The audio device according to claim 1,
   wherein the LED is configured to emit light in a plurality of colors, and wherein the LED control means is configured to control a light emission color of the LED depending on a state of voice recognition processing performed on the voice input to the microphone.

4. A non-transitory computer readable medium having stored thereon computer-readable instructions that, when executed by a computer-based processor, cause the computer-based processor in computer, the computer comprising a microphone and a light emitting diode (LED), to function as an audio device having a voice operation reception function of receiving an operation through a voice input to the microphone, the audio device comprising:
 LED control means for performing pulse width modulation (PWM) control on the LED;
 lighting pattern storage means for storing, for each state of voice recognition processing, a lighting pattern in which brightness is changed on a time axis,
 the LED control means being configured to perform PWM control on the LED in accordance with a lighting pattern that is stored in the lighting pattern storage means in association with a state of voice recognition processing performed on the voice input to the microphone;
 dictionary data storage means for storing voice recognition dictionary data for each language; and
 voice recognition processing means for performing voice recognition processing on the voice input to the microphone through use of the voice recognition dictionary data stored in the dictionary data storage means,
wherein, when a recognition result of the voice recognition processing performed on the voice input to the microphone indicates a request to start reception of a voice operation, the voice recognition processing means narrows down voice recognition dictionary data to be used in voice recognition processing performed on a voice subsequently input to the microphone, to voice recognition dictionary data of a language forming a sentence represented by the recognition result.

* * * * *